United States Patent

Owen et al.

[11] Patent Number: 6,087,661
[45] Date of Patent: Jul. 11, 2000

[54] THERMAL ISOLATION OF MONOLITHIC THERMAL DETECTOR

[75] Inventors: Robert A. Owen, Rowlett; Charles M. Hanson, Richardson; Steven N. Frank, McKinney; Howard R. Beratan, Richardson; Scott R. Summerfelt, Dallas, all of Tex.

[73] Assignee: Raytheon Company, Lexington, Mass.

[21] Appl. No.: 08/959,943

[22] Filed: Oct. 29, 1997

Related U.S. Application Data

[60] Provisional application No. 60/028,794, Oct. 31, 1996.

[51] Int. Cl.[7] .................................................. G01J 5/22
[52] U.S. Cl. ..................... 250/332; 250/338.3; 250/338.4
[58] Field of Search .............................. 250/338.4, 338.3, 250/332

[56] References Cited

U.S. PATENT DOCUMENTS

| | | |
|---|---|---|
| 4,143,269 | 3/1979 | McCormack et al. . |
| 4,354,109 | 10/1982 | Gelpey et al. .................... 250/349 |
| 5,008,541 | 4/1991 | Audaire et al. . |
| 5,021,663 | 6/1991 | Hornbeck . |
| 5,448,068 | 9/1995 | Lee et al. . |
| 5,486,698 | 1/1996 | Hanson et al. . |
| 5,512,748 | 4/1996 | Hanson . |
| 5,602,043 | 2/1997 | Beratan et al. . |
| 5,684,302 | 11/1997 | Wersing et al. . |
| 5,818,043 | 10/1998 | Buchy et al. ..................... 250/332 |
| 5,831,266 | 11/1998 | Jerominek et al. .............. 250/338.4 |
| 5,945,673 | 8/1999 | Beratan et al. . |
| 5,990,481 | 11/1999 | Beratan . |
| B1 5,021,663 | 7/1997 | Hornbeck . |

FOREIGN PATENT DOCUMENTS 57-145255  9/1982  Japan .

OTHER PUBLICATIONS

Beerman, "Investigation of Pyroelectric Material Characteristics for improved Infrared Detector Performance", Infrared Physics, 1975, vol. 15, pp. 225–231, Pergamon Press, Great Britain. (Sep.).

P. Gaucher, S.P. Faure, P. Barboux, "Ferroelectric Thin Film Research in France," ISIF 91, Proceedings, 3rd International Symposium on Integrated Ferroelectrics, Colorado Springs, CO, Apr. 3–5, 1991, cover page and pp. 205–214.

Robert Owen, Jeff Belcher, Howard Beratan, Steve Frank, "Producibility advances in hybrid uncooled infrared devices," Proceedings Reprint from Infrared Detectors and focal Plane Arrays III, SPIE—The International Society for Optical Engineering, Apr. 5–6, 1994, Orlando, FL, cover sheet and pp. 79–86.

Bernard M. Kulwicki, Ahmed Amin, Howard R. Beratan and Charles M. Hanson, "Pyroelectric Imaging," IEEE Publication, Sep. 1992, pp. 1–10.

Thermal Isolation for Hybrid Thermal Detectors, U.S. Patent Serial No. 08/268,365, filed Jun. 30, 1994.

Primary Examiner—Constantine Hannaher
Attorney, Agent, or Firm—Baker Botts L.L.P.

[57] ABSTRACT

A thermal sensor (36, 84, 114) comprising a thermal assembly (44, 88, 118) and a signal flowpath (46, 90, 120). The thermal assembly (44, 88, 118) may comprise a thermally sensitive element (50) and a pair of electrodes (52, 54). The thermally sensitive element (50) may generate a signal representative of an amount of thermal radiation incident to the thermally sensitive element (50). The electrodes (52, 54) may collect the signal generated by the thermally sensitive element (50). The signal flowpath (46, 90, 120) may transmit the signal collected by the electrodes (52, 54) to the substrate (34, 82, 112). The signal flowpath (46, 90, 120) may comprise a pair of arms (56, 58, 92, 122) each extending from an electrode (52, 54) and be connected to the substrate (34, 82, 112). The arms (56, 58, 92, 122) may support the thermal assembly (44, 88, 118) in spaced relation with the substrate (34, 82, 112). The arms (56, 58, 92, 122) may be formed of a thermally insulating material.

31 Claims, 4 Drawing Sheets

THERMAL ISOLATION OF MONOLITHIC THERMAL DETECTOR

This application claims priority under 35 USC § 119(e)(1) of provisional application Ser. No. 60/028,794 filed Oct. 31, 1996.

TECHNICAL FIELD OF THE INVENTION

The present invention relates generally to thermal isolation of solid state systems, and more particularly to thermal isolation of a monolithic thermal detector.

BACKGROUND OF THE INVENTION

Thermal detectors are often used in thermal (infrared) imaging systems such as night vision equipment. A thermal detector may include an array of thermal sensors that detect thermal radiance differences between various objects in a scene and that display these differences as a thermal image of the scene. The thermal sensors may define respective picture elements or pixels of the resulting thermal image.

One type of thermal sensor includes a thermal element disposed between a pair of electrodes. The electrodes may constitute capacitive plates to the thermal element, which may constitutes a dielectric disposed between the capacitive plates. The thermal sensor may be electrically and mechanically coupled to a substrate.

To maximize thermal response and enhance thermal image accuracy, thermal sensors are preferably isolated thermally from one another and from the associated substrate. Such thermal isolation ensures that the signals from each thermal sensor accurately represents incident infrared radiation. Several approaches have been used to enhance thermal isolation between the thermal sensors and the underlying substrate. These approaches have generally sacrificed other qualities of the thermal sensors to obtain enhanced thermal isolation.

SUMMARY OF THE INVENTION

Accordingly, a need has arisen for an improved thermal detector. The present invention provides a thermal detector having improved thermal isolation for thermal sensors that substantially eliminates or reduces the disadvantages and problems associated with prior thermal detectors.

In accordance with the present invention, a thermal sensor may comprise a thermal assembly and a signal flowpath. The thermal assembly may comprise a thermally sensitive element and a pair of electrodes. The thermally sensitive element may generate a signal representative of an amount of thermal radiation incident to the thermally sensitive element. The electrodes may collect the signal generated by the thermally sensitive element. The signal flowpath may transmit the signal collected by the electrodes to the substrate. The signal flowpath may comprise at least two posts extending from the substrate. A pair of arms may each extend from an electrode and be connected to the respective post. Alternatively, the arms may slope from the electrodes to the substrate directly. The arms may support the thermal assembly in spaced relation with the substrate. The arms may be formed of a thermally insulated material.

Important technical advantages of the present invention include providing an improved thermal detector. In accordance with one aspect of the invention, the thermal detector may have a high density of thermal sensors to improve resolution of the thermal detector. In accordance with another aspect of the invention, overall mechanical and electrical integrity of a signal flowpath may be increased to reduce or eliminate structural defects associated with thermal sensors.

Another important technical advantage of the present invention includes increasing thermal isolation of the thermal sensors. In particular, the thermal sensors may each be supported by a pair of bifurcated arms formed of thermally insulating material. In one embodiment, the bifurcated arms may be formed of a cermet or a semiconductive material that offers adequate electrical conductivity while enhancing thermal isolation between the thermal sensors and the substrate.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figures 1, 2:
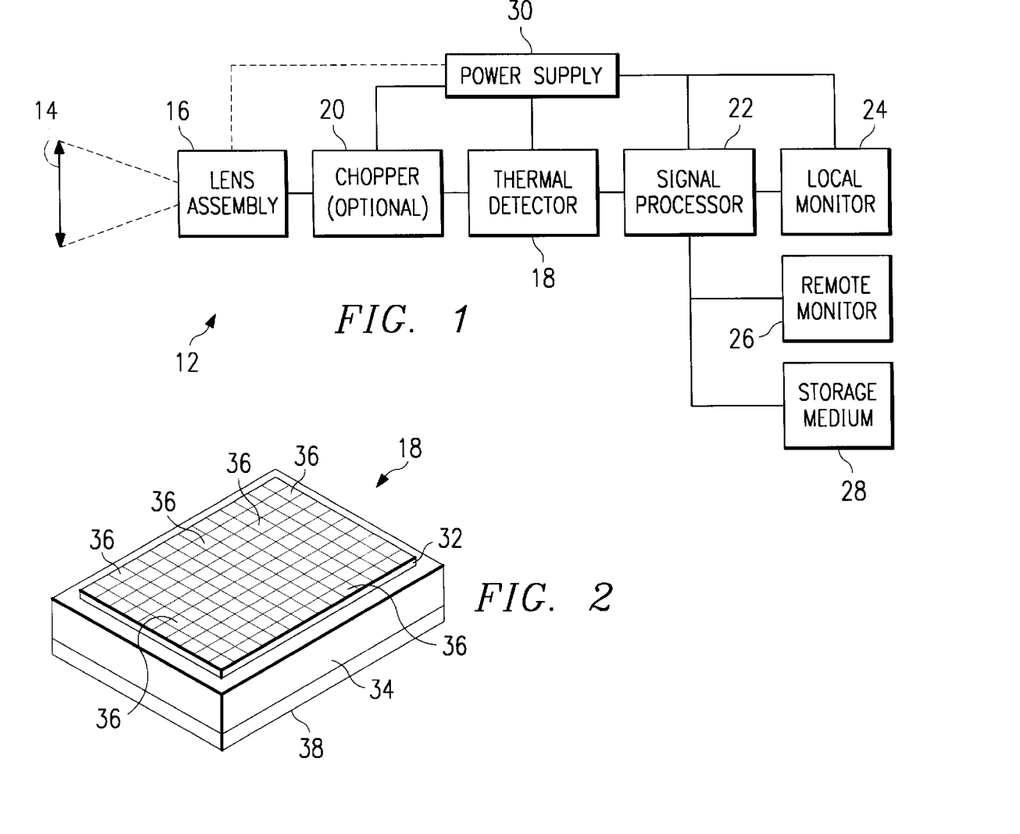
FIG. 1 is a block diagram showing the components of one embodiment of a thermal imaging system constructed in accordance with the present invention.
FIG. 2 is an isometric view of the thermal detector of FIG. 1, showing a focal plane array mounted to an integrated circuit substrate opposite a thermal element.

The preferred embodiments of the present invention and its advantages are best understood by referring now in more detail to FIGS. 1–6 of the drawings, in which like numerals refer to like parts throughout the several views. FIG. 1 shows a schematic block diagram of a thermal imaging system 12 constructed in accordance with the present invention. During operation, the thermal imaging system 12 detects, processes, and displays the heat image of a scene 14.

The thermal imaging system 12 may be especially useful when imaging by means of visual wavelengths is unavailable, such as in the dark or when vision is impaired by smoke, dust, or other particles. The thermal imaging system 12, however, is also useful during the day and when vision by means of the visual wavelengths is available. For example, the thermal imaging system 12 may be used to detect fires, overheating machinery, planes, vehicles and people, and to control temperature sensitive industrial processes.

The thermal imaging system 12 may detect thermal radiation in the infrared window. The infrared window is a wavelength region in the infrared spectrum where there is good transmission of electromagnetic radiation through the atmosphere. Typically, infrared detectors sense infrared radiation in the spectral bands from 3 to 5 microns (having an energy of 0.4 to 0.25 eV) and from 8 to 14 microns (having an energy of 0.16 to 0.09 eV). The 3–5 micron spectral band is generally termed the "near infrared band" while the 8 to 14 micron spectral band is termed the "far infrared band." Infrared radiation between the near and far infrared bands cannot normally be detected due to atmospheric absorption of the same.

As shown in FIG. 1, the thermal imaging system 12 may comprise a lens assembly 16 in optical communication with a thermal detector 18. The lens assembly 16 may focus or direct thermal radiation emitted by the scene 14 onto the thermal detector 18. The lens assembly 16 may include one or more lenses made of infrared transmitting material, such as germanium. It will be understood that the design of the lens assembly 16 may be varied depending on the particular application of the thermal imaging system 12. For example, the lens assembly 16 may have a constant or a variable F-number and/or may be a single field of view or a zoom lens.

The thermal detector 18 may be cooled or uncooled. A cooled thermal detector is operated at cryogenic temperatures such as at the temperature of liquid nitrogen, to obtain the desired sensitivity to variation in infrared radiation. In some cases where the thermal imaging system requires dynamic radiation input to generate or optimize a signal, a chopper 20 is disposed between the lens assembly 16 and the thermal detector 18. Preferably, the lens assembly 16, thermal detector 18 and chopper 20 are contained within an associated housing (not shown). The thermal detector 18 may also be contained within a vacuum environment or an environment of low thermal conductivity gas.

The chopper 20 may be controlled by a signal processor 22 to periodically interrupt transmission of the thermal image to the thermal detector 18. Various types of mechanical and/or electrical choppers 20 may be satisfactorily used with the present invention. For example, the chopper 20 may be a rotating disk with openings that periodically block and let pass infrared radiation.

The placement of the lens assembly 16 and the chopper 20 with respect to thermal detector 18 is accomplished using well known principles of optical design as applied to thermal imaging systems. As previously described, the lens assembly 16 focuses thermal radiation emitted by the scene 14 onto the thermal detector 18. The thermal detector 18 translates the incoming thermal radiation into corresponding electrical signals for processing.

The electrical signals of the thermal detector 18 may be passed to the signal processor 22, which assembles electrical signals into video signals for display. As previously described, the signal processor 22 may also synchronize operation of the chopper 20. This synchronization enables the signal processor 22 to subtractively process incoming thermal radiation to eliminate fixed background radiation. The output of the signal processor 22 is often a video signal that may be viewed, further processed, stored, or the like.

The video signal of the signal processor 22 may be viewed on a local monitor 24 or fed to a remote monitor 26 for display. The local monitor 24 may be an eye piece containing an electronic viewfinder, a cathode ray tube, or the like. Similarly, the remote monitor 26 may comprise an electronic display, a cathode ray tube, such as a television, or other type of device capable of displaying the video signal. The video signal may also be saved to a storage medium 28 for later recall. The storage medium 28 may be a compact disk, a hard disk drive, random access memory, or any other type of medium capable of storing electronic video signals for later recall. Monitors and storage mediums are well known in the art and therefore will not be further described herein.

Electrical power to operate the thermal imaging system 12 may be provided by a power supply 30. The power supply 30 provides electrical power directly to the chopper 20, the thermal detector 18, the signal processor 22, and to the local monitor 24. Electrical power may also be provided to the lens assembly 16, when, for example, a motor is employed to zoom the lens assembly 16.

FIG. 2 is a detailed view of the thermal detector 18. The thermal detector 18 may comprise a focal plane array 32 mounted to a substrate 34. In one embodiment, the focal plane array 32 may include a number of thermal sensors 36 arranged in a matrix. The quantity and location of the thermal sensors 36 depend upon the N by M configuration desired for the focal plane array 32.

The configuration of the focal plane array 32 generally varies for different types of thermal detectors 18. In a "staring" thermal detector, for example, the entire thermal image is focused onto a large focal plane array. By contrast, a "scanning" thermal detector uses a mirror or similar means to sweep successive portions of the thermal image across a small focal plane array. Usually, although not necessary for the invention, both types of thermal detectors 18 consist of a number of thermal sensors 36, with the output of each thermal sensor 36 representing a portion of the viewed scene 14. For example, the output of each thermal sensor 36 in focal plane array 32 may represent a single pixel of the total image. This embodiment may be particularly beneficial for use in connection with high density visual displays.

The substrate 34 may be an integrated circuit substrate that provides the necessary electrical couplings and circuitry to process the thermal image formed on the focal plane array 32. The integrated circuit substrate 34 may be formed of silicon, ceramic alumina, or other suitable materials which are both chemically and thermally compatible with the multiple layers and the fabrication process of the thermal sensors 36. Further information regarding thermal sensors mounted on an underlying integrated circuit substrate is disclosed by U.S. Pat. No. 4,143,269 issued to McCormack, et al., entitled "Ferroelectric Imaging System" and U.S. Pat. No. 5,021,663 issued to Hornbeck, entitled "Infrared Detector."

A thermal element 38 may be provided to maintain the integrated circuit substrate 34 at a constant predefined temperature. The constant temperature prevents ambient or internally generated temperature gradients from affecting the thermal sensors 36 and thus provides a baseline with which the thermal energy of the scene 14 can be accurately measured. The constant temperature may also be used to optimize detector performance in a case where the detecting material has varying performance with different temperatures. The necessary electrical couplings and circuitry to control the thermal element 38 may be provided by the integrated circuit substrate 34. In such a case, the thermal element 38 may be coupled to the integrated circuit substrate 34 opposite the focal plane array 32.

Figure 3:
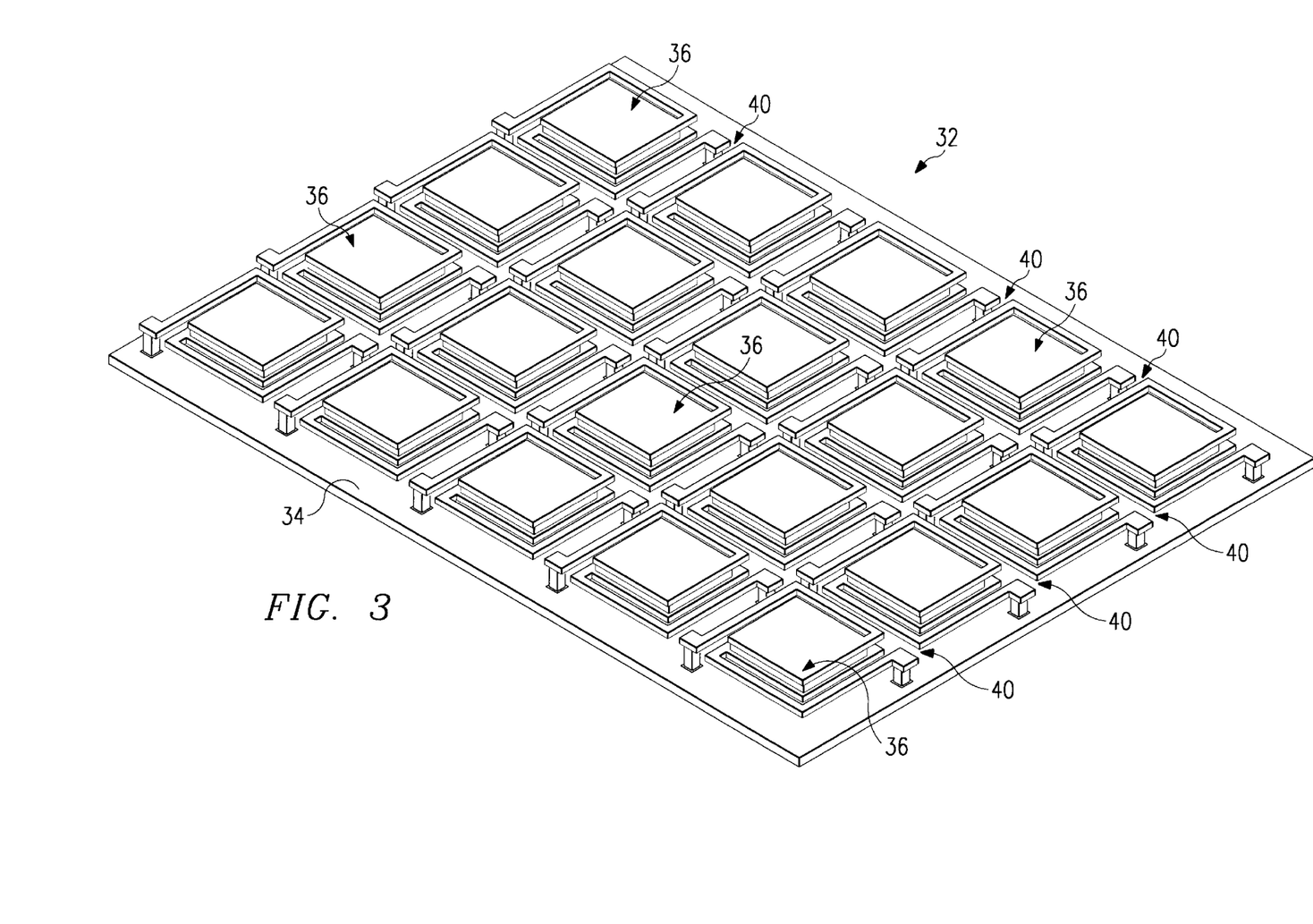
FIG. 3 is a detailed isometric view of the focal plane array of FIG. 2, showing a matrix of thermal sensors configured in accordance with one embodiment of the present invention.

FIG. 3 illustrates a detailed view of one embodiment of the previously described focal plane array 32. As shown by FIG. 3, each thermal sensor 36 may form a discrete element of the focal plane array 32. The thermal sensors 36 may be separated by a set of intersecting slots 40 provided around the perimeter of each thermal sensor 36. The slots 40 may provide a high degree of reticulation between adjacent thermal sensors 36 that substantially reduces thermal spreading between the pixel elements.

The thermal sensors 36 may detect thermal radiation using various techniques. For example, the thermal sensors may be based upon the generation of a charge due to a change in temperature resulting from thermal radiation heating the thermal sensors 36. Alternatively, the thermal sensors 36 may be based upon the generation of a charge due to a photon-electron interaction within the material used to form the thermal sensors 36. This latter effect is sometimes called the internal photoelectric effect. The thermal sensors 36 may also be based upon the change in resistance of a thin conductor caused by the heating effect of thermal radiation. Such thermal sensors 36 are sometimes referred to as bolometers. It will be understood that these and other types of thermal sensors 36 may be used in accordance with the present invention.

Figure 4:
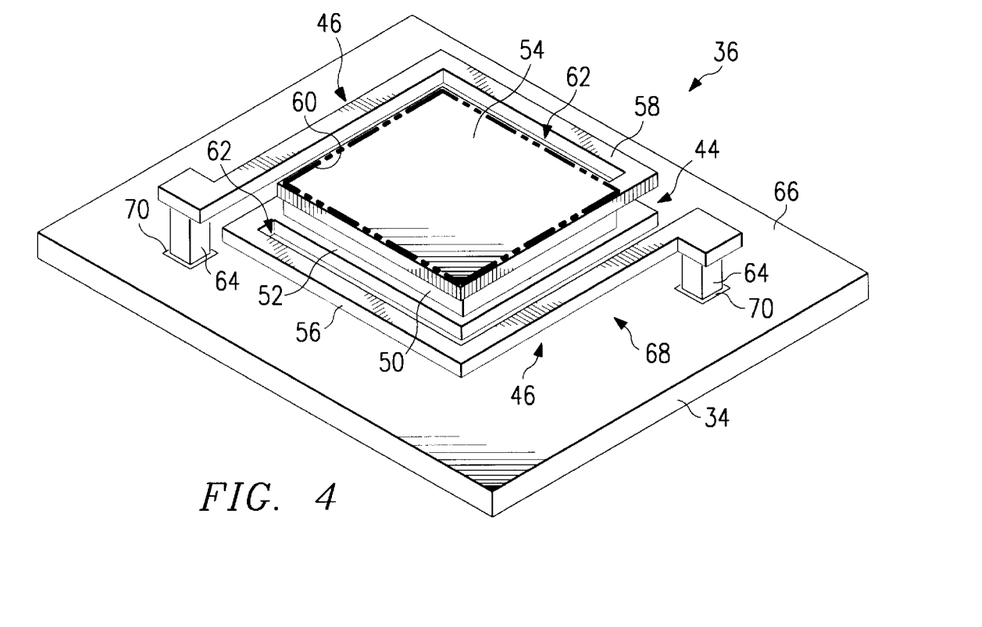
FIG. 4 is a detailed isometric view of one of the thermal sensors of FIG. 3, showing a thermally sensitive element disposed between a pair of thin film electrodes.

FIG. 4 illustrates a detailed view of one of the thermal sensors 36. Each thermal sensor 36 may comprise a thermal assembly 44 and a signal flowpath 46 to electrically and mechanically couple the thermal assembly 44 to the substrate 34. The thermal assembly 44 may include a thermally sensitive element 50, a first electrode 52 and a second electrode 54.

In one embodiment, the thermally sensitive element 50 is preferably formed from pyroelectric materials. The pyroelectric materials may also be ferroelectric materials such as barium strontium titanate (BST), barium titanate (BT), and antimony sulfoiodide (SbSI), or any lead containing ferroelectric material including lead titanate (PT), lead lanthanum titanate (PLT), lead zirconate titanate (PZT), lead lanthanum zirconate titanate (PLZT), lead zinc niobate (PZN), lead strontium titanate (PSrT), and lead scandium tantalate (PST). In this embodiment, the thermally sensitive element 50 generates a signal in response to a change in temperature. It will be understood that the signal generated by the thermally sensitive element 50 may be a charge or any other type of electrical signal representative of an amount of thermal radiation incident to the thermally sensitive element 50. It will be further understood that the present invention contemplates forming the thermally sensitive element 50 from any thermal sensitive material that provides a satisfactory response to thermal radiation.

The thickness of the thermally sensitive element 50 may vary depending upon the wavelength of thermal radiation that the thermal imaging system 12 is designed to detect. Alternatively, the space 68 between the thermal assembly 44 and the surface 66 of the substrate 34 may vary to tune wavelength absorption if the thermal assembly 44 is designed to be relatively transparent. The thermally sensitive element 50 is preferably a thin film to enhance responsiveness to thermal radiation and transmission of a generated charge to the electrodes 52 and 54.

The first electrode 52 and the second electrode 54 may be disposed on opposite sides of the thermally sensitive, or pyroelectric, element 50. In this arrangement, the electrodes 52 and 54 are in electrical communication with the thermally sensitive element 50, which includes capacitive coupling. Accordingly, the electrodes 52 and 54 collect signals generated by the thermally sensitive element 50 in response to thermal radiation. It will be understood that the electrodes 52 and/or 54 may be any type of electrically conductive elements capable of collecting signals generated by the thermally sensitive element 50.

The electrodes 52 and 54 may be thin film electrodes. Thin film electrodes are generally preferred because they may be virtually transparent to thermal radiation. Thin film electrodes are also preferred because they do not rob absorbed thermal energy from the thermally sensitive element 50. Additionally, the thin film electrode 52 may be opaque if the infrared radiation is absorbed within the thermally sensitive element 50.

The thermal assembly 44 is preferably supported above the integrated circuit substrate 34 by the signal flowpath 46. A problem associated with previous thermal detectors is the relatively high thermal conductivity associated with electrical conductivity of the signal flowpaths. High thermal conductivity often distorts signals generated by the thermal sensor to where the signals do not accurately represent incident infrared radiation. To compensate for the high electrical conductivity of the signal flowpath, other qualities of thermal sensors have been sacrificed to increase thermal isolation of the thermal sensors. In some thermal detectors, the geometry of the signal flowpath has been minimized to increase resistance of the signal flowpath and thus reduce thermal conductance, which is generally proportional to electrical conductance. The minimal geometry of such detectors minimizes electrical and mechanical integrity of the signal flowpath and can lead to structural defects. In other thermal detectors, the length of the signal flowpath has been extended around the thermal assembly. Extension of the signal flowpaths increases resistance of the signal flowpath, which is generally proportional to length of the flowpath. Extended signal flowpath reduce the density of thermal sensors that can be mounted in a given area and thus reduce resolution of the thermal detector. Additionally the extended signal flowpaths can lead to structural defects such as buckling. Still other thermal detectors have employed relatively large thermal sensors that reduce resolution of the thermal detectors.

The present invention solves the problem of high thermal conductivity by forming the signal flowpath of thermally insulating material, such as cermet or a semiconductive material. The material is preferably chosen to optimize thermal isolation and mechanical integrity while providing adequate electrical conductivity for the associated signal flowpath.

Given the relationship of the geometry of the signal flowpath, the length of the signal flowpath, and the size of the thermal sensors to thermal isolation, the signal flowpath may be designed to optimize mechanical integrity or resolution of the thermal sensors for a given thermal isolation. Additionally, a compromise of both mechanical integrity and resolution of the thermal sensors can be reached for a desired thermal isolation.

For the embodiment of FIGS. 3–4, electrical and mechanical integrity of the thermal sensors 36 is maximized. As shown by FIG. 4, the signal flowpath 46 may comprise a first support arm 56 and a second support arm 58. The first support arm 56 preferably extends from the first electrode 52. The second support arm 58 preferably extends from the second electrode 54. In another embodiment, the thermally sensitive element 50 may be divided into separate sections and the support arms 56 and 58 may extend from one side of the thermally sensitive element 50.

In accordance with the present invention, the arms 56 and 58 may be formed of a thermally insulating material which provides a high degree of thermal isolation between a thermal assembly 44 and the substrate 34. Previous thermal isolation structures often use titanium tungsten or other metals characterized by high electrical conductivity to form sections of the signal flowpath 46. However, these metals also exhibit high thermal conductivity which degrades thermal isolation. The present invention forms the arms 56 and 58 from a cermet, a semiconductive material, or other material characterized by low thermal conductivity with adequate mechanical strength and electrical conductivity. Accordingly, for a given thermal isolation, the geometry of the arms 56 and 58 may be increased to optimize electrical and mechanical integrity.

In one embodiment, the arms 56 and 58 may be formed from a cermet having approximately eighty percent chromium and twenty percent silicon monoxide. Depending upon the specific application, appropriate cermets may have a metal concentration by weight of about seventy percent to ninety percent and a corresponding ceramic concentration by weight of about thirty percent to ten percent.

For one application, the cermet used to form the arms 56 and 58 will preferably have an electrical resistivity of 2,500 microhm-centimeter and a thermal conductivity of $1.1 \times 10^{-2}$ watts/centimeter/° C. A matrix of silicon monoxide and chromium is representative of the types of cermet which can provide these desired characteristics. By way of comparison, titanium tungsten exhibits a thermal conductivity of 0.09 watts/centimeter/° C. Thus, the use of thermally insulating cermets may result in a substantial improvement in thermal isolation between the thermal assemblies 44 and the substrate 34. In addition to various cermets, the arms 56 and 58 may be formed from a semiconductive material. Semiconductive materials have been used as thin film resistors in previous thermal imaging applications, but the present invention uses semiconductive materials to form the signal pathway 46. Some appropriate semiconductive materials include chromium oxides ($Cr_xN_y$), silicon oxides ($Si_xO_y$), tantalum nitrides ($Ta_xN_y$), tantalum oxides ($Ta_xO_y$) tantalum oxide nitrides ($Ta_xO_yN_z$), polysilicons, and other metal oxides and metal nitrides. Conductive organic materials may also be used to form the arms 56 and 58. Additionally, lanthanum strontium cobalt oxide (LSCO), ruthenium, ruthenium oxide, or strontium ruthenate may be used as alternatives to cermet. The present invention contemplates using a wide variety of thermally insulating materials to form the arms 56 and 58 with the desired characteristics of low thermal conductivity, adequate electrical conductivity, and improved strength.

Depending upon the type of thermally insulating material selected, the arms 56 and 58 may be formed as part of a monolithic detector 18 using reactive sputtering techniques or composite target sputtering. For one application of the present invention, sputtering with silicon and chromium in an oxygen environment may be used to form the arms 56 and 58 with the desired characteristics. Composite target sputtering allows compositional control to achieve the desired stoichiometry of the resulting arms 56 and 58. Arms 56 and 58 may each be formed from a single film of thermally insulating material. A single film approach simplifies the fabrication process and also provides easier optimization of the thermal, electrical, and structural properties of the arms 56 and 58.

The arms 56 and 58 may each have a thickness greater than 50 angstroms. In one embodiment, the arms 56 and 58 may have a thickness of between 100 and 1,000 angstroms. This thickness greatly increases the geometry of the arms 56 and 58 to optimize electrical and mechanical integrity of the signal flowpath 46. Accordingly, structural defects are reduced or eliminated.

The thermally sensitive element 50 preferably has a relatively small active area with a high fill factor. Fill factor is the ratio of active area size to thermal assembly size to provide relatively high resolution. As used herein, the term active area means the area of the thermally sensitive element 50 that generates a signal in response to incident thermal radiation. In one embodiment the thermally sensitive element may have an active area of less than 3,000 square microns.

The length of this support arms 56 and 58 may be selected to enhance the resistance to the transfer of thermal energy between the thermal assembly 44 and the substrate 34. In one embodiment, the arms 56 and 58 may extend a distance equal to or less than half of a perimeter length 60 of the thermal assembly 44. Thus, the present invention provides electrical and mechanical integrity for thermal sensors 36 having a relatively small size and a relatively short signal flowpath, each of which contributes to a relatively high resolution and improved fill factor of the thermal detector 18.

For many applications, the electrodes 52 and 54 may be formed from the same layer and/or type of material as the arms 56 and 58. Forming an electrode and an associated arm of the same layer and material may be preferred to simplify the fabrication process. It will be understood, however, that the electrodes 52 and 54 may be formed of a different material and/or layer than the arms 56 and 58.

A pair of slots 62 may be formed between each support arm 56 and 58 and its respective electrode 52 and 54. The slots 62 may bifurcate the support arms 56 and 58 to provide additional thermal isolation between the support arms 56 and 58 and their associated electrodes 52 and 54.

The signal flowpath 46 may include a pair of posts 64 to support the arms 56 and 58, and thus the thermal assembly 44, in spaced relation with a surface 66 of the substrate 34. The posts 64 may each support one of the arms 56 and 58. The posts 64 may be formed from material which is electrically conductive to transmit electrical signals carried by the arms 56 and 58 to a set of contact pads 70 of the substrate 34. Thus, the posts 64 provide both mechanical support and a signal flowpath to the contact pads 70. The post 64 may be formed of a thermally insulating material such as previously described in connection with the arms 56 and 58. The posts 64 may also be eliminated by sloping the arms 56 and 58 between the thermal assembly 44 and the substrate 34.

A chamber 68 may be formed by the gap between the bottom of the first electrode 52 and the surface 66 of the integrated circuit substrate 34. The thermally sensitive element 50 may absorb thermal radiation directly or in part after the radiation has passed through the chamber 68 and reflected off the substrate 34. For an embodiment in which thermal radiation is absorbed in part after reflecting off the substrate 34, the dimensions of the chamber 68 may be varied depending upon the wavelength of the thermal radiation that the thermal imaging system 12 is designed to detect. The chamber 68 preferably corresponds to about one-fourth of the selected thermal radiation wavelength. Thus, if thermal imaging system 12 is designed to detect thermal radiation having a wavelength of 7.5 to 14 microns, the chamber 68 preferably has a height of approximately two to three microns. In this embodiment, the electrodes 52 and 54 may be transparent to thermal radiation. The ability to vary the position of bottom of the first electrode 52 with respect to the surface 68 of the integrated substrate 34 enhances the responsiveness of thermal sensor 36 to thermal radiation.

Various techniques may be used to form the thermally sensitive element 50, the electrodes 52 and 54, the signal flowpath 46 and any sacrificial or barrier layers. Often these techniques are divided into two groups—film growth by interaction of a vapor deposited species with an associated substrate and film formation by deposition without causing changes to the associated substrate. The first group of thin film growth techniques includes thermal oxidation and nitridation of single crystal silicon and polysilicon. The formation of silicides by direct reaction of a deposited metal and the substrate is also frequently included in this first group of thin film growth techniques.

The second group of thin film growth techniques may be further divided into three subclasses of deposition. The first subclass is often referred to as chemical vapor deposition (CVD) in which solid films are formed on a substrate by the chemical reaction of vapor phase chemicals which contain the desired constituents for the associated thin film layer. The second subclass is often referred to as physical vapor deposition (PVD) in which the desired thin film layer is physically dislodged from a source to form a vapor and transport it across a reduced pressure region to the substrate. The dislodged layer is then condensed to form the desired thin film layer. The third subclass typically involves coating the substrate with a liquid which is then dried to form the desired thin film layer. The formation of thin film layers by PVD includes such processes as sputtering, evaporation and molecular beam epitaxy. Spin coating is one of the most commonly used techniques for depositing liquids on a substrate to form a thin film layer.

Thin film layers may also be satisfactorily grown in accordance with the teachings of the present invention by using techniques such as dipping, vapor phase deposition by sputtering or MOCVD, and sol/gel or metal organic decomposition (MOD) by spin coating. Processes should be selected to establish the desired electrical and thermal characteristics for the resulting thermal sensors 36. Additionally, depending upon the type of materials used to form the layers, one or more barrier or protective layers (not shown) may be disposed between layers.

The various techniques may be integrated to allow fabrication of the thermal sensors 36 on substrate 34 using processes associated with the manufacture of very large scale integrated circuits. Material usage and overall process efficiency associated with fabricating a focal plane array 32 may be substantially improved, for example, by forming layers with approximately the same thickness as desired for their corresponding elements 50. Thus, the possibility of polishing damage if polishing is used, is substantially reduced or eliminated. Also, topographic variations are minimized, thus reducing subsequent layer processing difficulty.

Figure 5:
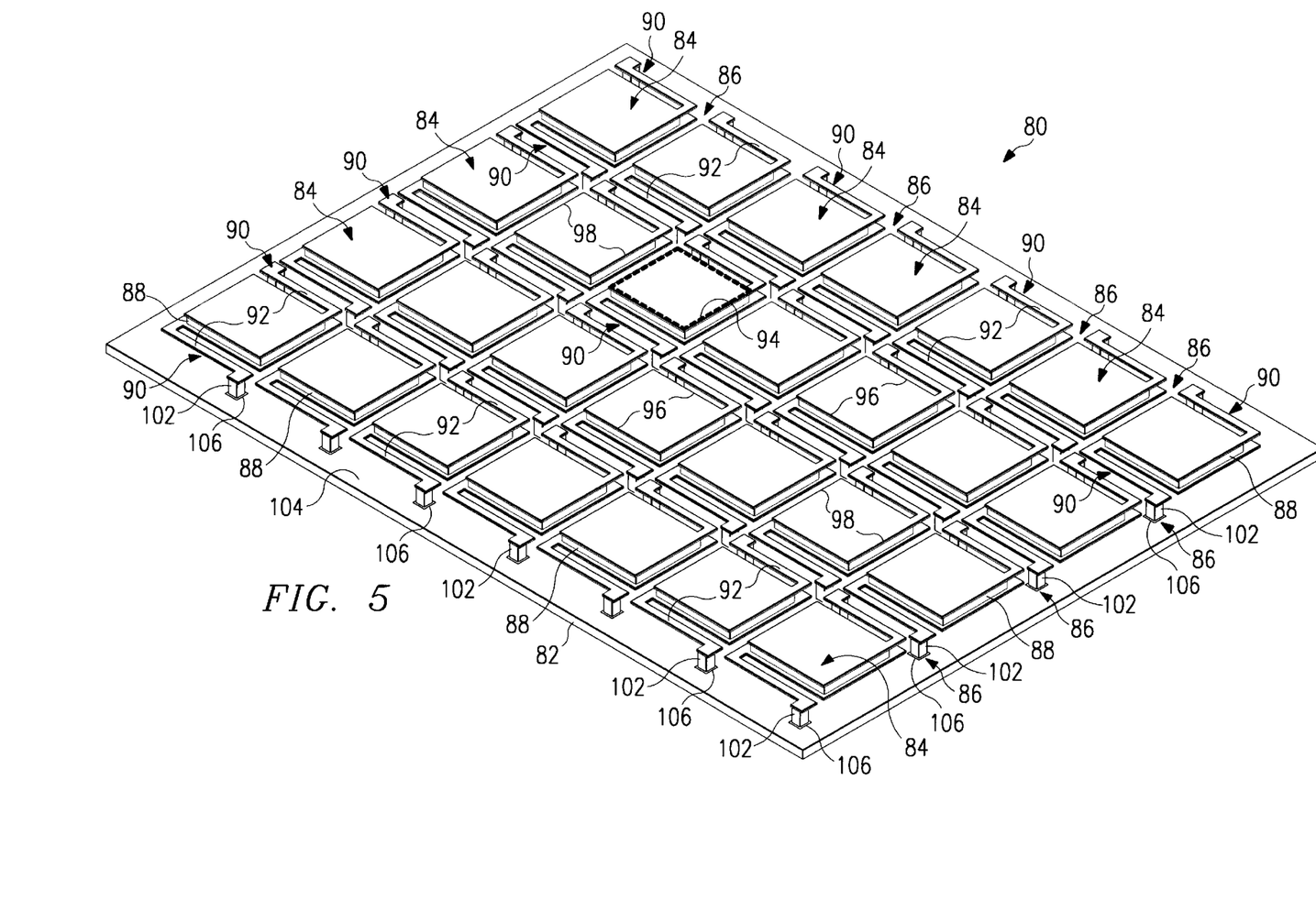
FIG. 5 is a detailed isometric view of the focal plane array of FIG. 2, showing a matrix of thermal sensors configured in accordance with another embodiment of the present invention.

FIG. 5 illustrates a detailed view of an alternative embodiment of a focal plane array 80 in which extension of signal flowpaths may be minimized. As shown by FIG. 5, the focal plane array 80 may be mounted to a substrate 82. The substrate 82 may be an integrated circuit substrate as previously described for the substrate 34. The substrate 82 may provide the necessary electrical couplings and circuitry to process the thermal image formed on the focal plane array 80.

The focal plane array 80 may include a number of thermal sensors 84 arranged in a matrix. The quantity and location of the thermal sensors 84 may depend upon the N×M configuration desired for the focal plane array 80. The focal plane array 80 may be a starring or scanning thermal detector as described above in connection with FIG. 2.

Each thermal sensor 84 may form a discreet element on the focal plane array 80. The thermal sensors 84 may be separated by a set of intersecting slots 86 provided around the perimeter of each thermal sensor 84. The slots 86 may provide a high degree of reticulation between adjacent thermal sensors 84.

Each thermal sensor 84 may comprise a thermal assembly 88 and a signal flowpath 90. The signal flowpath 90 may electrically and mechanically couple the thermal assembly 88 to the substrate 82. The thermal assembly 88 may include a thermally sensitive element and a pair of electrodes as previously described for the thermal assembly 44. The signal flowpath 90 may include a pair of support arms 92 each extending from one of the electrodes of the thermal assembly 88. The arms 92 may be bifurcated as previously described for arms 56 and 58.

In accordance with the present invention, the support arms 92 may be formed of a thermally insulating material that provides a high degree of thermal insulation between the thermal assembly 88 and the substrate 82. The thermally insulating material may be cermet, a semi-conductive material, or other material characterized by low thermal conductivity, adequate mechanical strength and electrical conductivity.

The support arms 92 may extend a distance less than half of a perimeter length 94 of the thermal assembly 88. In one embodiment, the support arms 92 may extend along opposite edges 96 of the thermal assembly 88. A set of opposing edges 98 of the thermal assembly 88 may border a neighboring thermal sensor 84. In another embodiment, an arm may extend from each corner of the thermal assembly 88 to a central support shared by the thermal assemblies 88 surrounding the support. In this embodiment, the arms may be only a fraction of the perimeter length 94. Reduction in the length of the arms 92, and thus the signal flowpath 90, allows the density of the thermal sensors 84 to be increased within the focal plane array 80. Thus, the resolution of the thermal detector 18 is increased.

The thermally sensitive element of the thermal assembly 88 preferably has a relatively small active area with a high fill factor. Fill factor is the ratio of active area size to thermal assembly size to provide relatively high resolution. In one embodiment, the thermally sensitive element may have an active area of less than 3,000 square microns.

The geometry of the arms 92 may be selected to enhance resistance to the transfer of thermal energy between the thermal sensors 84 and the substrate 82. In one of the embodiment, the arms 92 may each have a thickness equal to or greater than 25 angstroms. Thus, the present invention provides for a high density of thermal sensors 84 having a relatively small size and an adequate signal flowpath 90 geometry.

The signal flowpath 90 may include a pair of post 102 to support the arms 92, and thus the thermal assembly 88, in space relation with a surface 104 of the substrate 82. The posts 102 may each support one of the arms 92. The posts 102 may be formed from material that is electrically conductive to transmit electrical signals carried by the arms 92 to a set of contact pads 106 of the substrate 82. Thus, the posts 102 provide both mechanical support and a signal flowpath to the contact pads 106. The posts 102 may be formed of a thermally insulating material such as previously described in connection with the arms 92. The posts 64 may also be eliminated by sloping the arms 92 between the thermal assembly 88 and the substrate 82.

Figure 6:
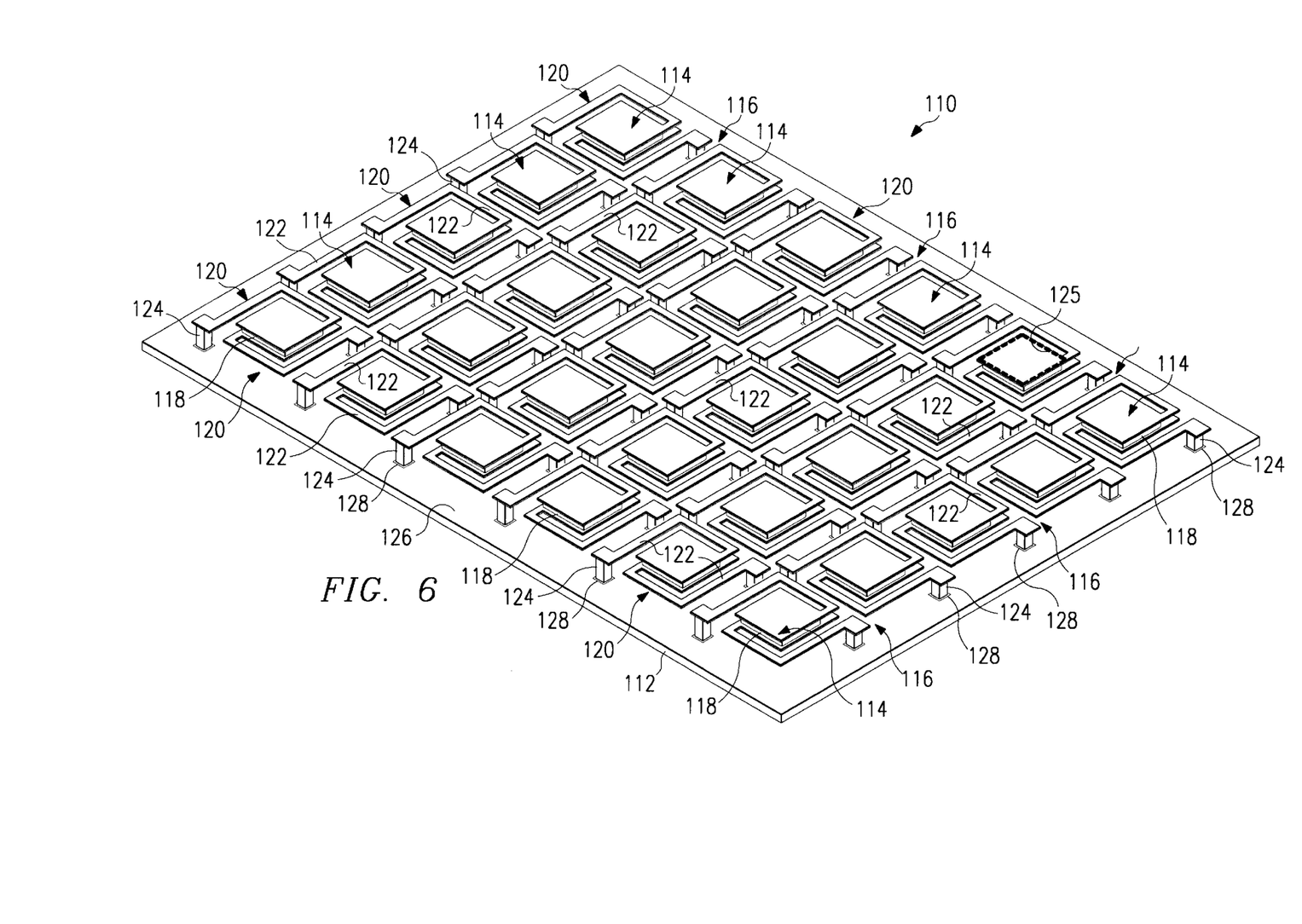
FIG. 6 is a detailed isometric view of the focal plane array of FIG. 2, showing a matrix of thermal sensors configured in accordance with still another embodiment of the present invention.

FIG. 6 illustrates a detailed view of an alternative embodiment of a focal plane array 110 in which the thermal isolation is further enhanced. As shown by FIG. 6, the focal plane array 110 may be mounted to a substrate 112. The substrate 112 may be an integrated circuit substrate as previously described for the substrate 34. The substrate 112 may provide the necessary electrical couplings and circuitry to process the thermal image formed on the focal plane array 110.

The focal plane array 110 may include a number of thermal sensors 114 arranged in a matrix. The quantity and location of the thermal sensors 114 may depend upon the N×M configuration desired for the focal plane array 110. The focal plane array 110 may be a starring or scanning thermal detector as described above in connection with FIG. 2.

Each thermal sensor 114 may form a discreet element on the focal plane array 110. The thermal sensors 114 may be separated by a set of intersecting slots 116 provided around the perimeter of each thermal sensor 114. The slots 116 may provide a high degree of reticulation between adjacent thermal sensors 114.

Each thermal sensor 114 may comprise a thermal assembly 118 and a signal flowpath 120. The signal flowpath 120 may electrically and mechanically couple the thermal assembly 118 to the substrate 112. The thermal assembly 118 may include a thermally sensitive element and a pair of electrodes as previously described for thermal assembly 44. The signal flowpath 120 may include a pair of support arms 122 each extending from one of the electrodes of the thermal assembly 118. The arms 122 may be bifurcated as previously described for arms 56 and 58.

In accordance with the present invention, the support arms 122 may be formed of a thermally insulating material that provides a high degree of thermal insulation between the thermal assembly 118 and the substrate 112. The thermally insulating material may be cermet, a semi-conductive material, or other material characterized by low thermal conductivity, adequate mechanical strength and electrical conductivity.

For the embodiment of FIG. 6, the thermally sensitive element of the thermal assembly 114 may have a reduced active area as a result of the longer arms 122. In one embodiment, the thermally sensor element may have active area of less than 1,000 square microns. The length and geometry of the arms 122 may be selected to enhance resistance to transfer of thermal energy between the thermal sensors 114 and the substrate 112. In one embodiment, the arms 122 may have a thickness equal to or greater than 25 angstroms. The arms 122 may extend a distance equal to or less than half of a perimeter length 125 of the thermal assembly. Thus, the present invention provides a high resolution thermal sensor 114 having enhanced thermal isolation and a high fill factor.

The signal flowpath 120 may include a pair of post 124 to support the arms 122, and thus the thermal assembly 118 in space relation with a surface 126 of the substrate 112. The posts 124 may each support one of the support arms 122. The posts 124 may be formed from material that is electrically conductive to transmit electrical signals carried by the arms 122 to a set of contact pads 128 of the substrate 112. Thus, the posts 124 provide both mechanical support and a signal flow path to the contact pads 128. The posts 124 may be formed of a thermally insulating material such as previously described in connection with the arms 122. The posts 64 may also be eliminated by sloping the arms 122 between the thermal assembly 118 and the substrate 112.

Although the present invention has been described with several embodiments, various changes and modifications may be suggested to one skilled in the art. It is intended that the present inventions encompass such changes and modifications as fall within the scope of the appended claims.

What is claimed is:

1. A thermal sensor, comprising:
a thermal assembly, including:
a thermally sensitive element operable to generate a signal representative of an amount of thermal radiation incident to the thermally sensitive element;
a pair of electrodes operable to collect the signal generated by the thermally sensitive element;
a signal flowpath operable to transmit the signal collected by the electrodes to a substrate, including:
a pair of arms each extending from a respective said electrode and connected to the substrate;
the arms supporting the thermal assembly in spaced relation with the substrate; and
the arms each being formed of a thermally insulating material which provides electrical conductivity to transmit the signal collected by the electrodes to the substrate.

2. The thermal sensor of claim 1, wherein the arms are each formed of a semiconductive material.

3. The thermal sensor of claim 1, wherein the arms are each formed of low thermal conductivity cermet.

4. The thermal sensor of claim 1, wherein the arms are formed of a conductive organic material.

5. The thermal sensor of claim 1, further comprising:
the thermally sensitive element having an active area of less than 3000 square microns;
each of the arms having a thickness greater than 50 angstroms; and
each of the arms extending a distance equal to or less than half of a perimeter length of the thermal assembly.

6. The thermal sensor of claim 1, further comprising:
the thermally sensitive element having an active area of less than 3000 square microns;
each of the arms having a thickness equal to or greater than 25 angstroms; and
each of the arms extending a distance less than half of a perimeter length of the thermal assembly.

7. The thermal sensor of claim 1, further comprising:
the thermally sensitive element having an active area of less than 3000 square microns;
each of the arms having a thickness equal to or greater than 25 angstroms; and
each of the arms extending a distance equal to or less than a quarter of a perimeter length of the thermal assembly.

8. A thermal detector, comprising:
a focal plane array including a plurality of thermal sensors;
the thermal sensors each including:
a thermal assembly, including:
a thermally sensitive element operable to generate a signal representative of an amount of thermal radiation incident to the thermally sensitive element;
a pair of electrodes operable to collect the signal generated by the thermally sensitive element;
a signal flowpath operable to transmit the signal collected by the electrodes to a substrate, including:
a pair of arms each extending from a respective said electrode and connected to the substrate;
the arms supporting the thermal assembly in spaced relation with the substrate; and the arms each being formed of a thermally insulating material which provides electrical conductivity to transmit the signal collected by the electrodes to the substrate.

9. The thermal detector of claim 8, wherein the arms are each formed of a semiconductive material.

10. The thermal detector of claim 8, wherein the arms are each formed of low thermal conductivity cermet.

11. The thermal detector of claim 8, wherein the arms are each formed of a conductive organic material.

12. The thermal detector of claim 8, further comprising:
the thermally sensitive element having an active area of less than 3000 square microns;
each of the arms having a thickness greater than 50 angstroms; and
each of the arms extending a distance equal to or less than half of a perimeter length of the thermal assembly.

13. The thermal detector of claim 8, further comprising:
the thermally sensitive element having an active area of less than 3000 square microns;
each of the arms having a thickness equal to or greater than 25 angstroms; and
each of the arms extending a distance equal to or less than a quarter of a perimeter length of the thermal assembly.

14. The thermal detector of claim 8, further comprising:
the thermally sensitive element having an active area of less than 3000 square microns;
each of the arms having a thickness equal to or greater than 25 angstroms;
the arms extending along a set of opposed edges of the thermal assembly; and
a second set of opposed edges bordering a neighboring thermal sensor.

15. A method of electrically coupling a thermally sensitive element to a substrate, comprising the steps of:
electrically coupling a thermally sensitive element to a pair of electrodes;
electrically coupling each said electrode to a respective arm;
electrically coupling each of the arms to the substrate; and
forming each of the arms from a material which is thermally insulating and which is electrically conductive so as to transmit the signal collected by the electrodes to the substrate.

16. The method of claim 15, wherein each of the electrodes includes first and second edges, each arm having first and second portions which are each parallel to a respective said edge.

17. The method of claim 15, wherein each of the arms is formed of a semiconductive material.

18. The method of claim 15, wherein each of the arms is formed of low thermal conductivity cermet.

19. The method of claim 15, wherein each of the arms is formed of conductive organic material.

20. The method of claim 15, further comprising the step of forming each of the arms with a thickness between 100 and 500 angstroms.

21. An apparatus, comprising:

a substrate;

a thermally sensitive element which generates an electrical signal representative of an amount of thermal radiation impinging thereon;

a pair of spaced electrodes which are each adjacent said thermally sensitive element and which collect the signal generated by said thermally sensitive element; and a support structure which supports said thermally sensitive element in spaced relation with said substrate, said support structure including two arms which are each coupled at one end to a respective said electrode, and including two signal flowpaths which each extend between said substrate and a respective said electrode through a respective said arm, said signal flowpaths each being made of a material which is thermally insulating and which is electrically conductive so as to transmit the signal collected by said electrodes to said substrate.

22. The apparatus of claim 21, wherein said material from which said signal flowpaths are made is selected from the group consisting of semiconductors, cermets and organic materials.

23. The apparatus of claim 21, wherein the support structure further comprises a pair of electrically conductive posts extending from said substrate, each coupled with a respective said arm and supporting said respective arm in a spaced relation with said substrate, each said flowpath extending through a respective said post.

24. The apparatus of claim 21, wherein each said arm is sloped between said substrate and a respective said electrode.

25. The apparatus of claim 21, wherein each of the electrodes has an edge, and each arm has a portion which is parallel to the edge of a respective said electrode.

26. The apparatus of claim 21, wherein said material of said signal flowpath is a cermet which includes a metal concentration by weight of approximately seventy to ninety percent and a ceramic concentration by weight of approximately ten to thirty percent.

27. The apparatus of claim 21, wherein each said arm is made entirely of said thermally insulating material, each said arm forming a respective said flowpath.

28. The apparatus of claim 21, wherein said electrodes are made of said material.

29. The apparatus of claim 21, wherein said electrodes are thin film electrodes.

30. The apparatus of claim 21, wherein a distance between said substrate and said thermally sensitive element is selected as a function of a predetermined wavelength of the thermal radiation which is to be detected.

31. The apparatus of claim 21, further comprising a thermal element operable to maintain said substrate at a preselected temperature.

* * * * *